June 23, 1964  J. EGGERT ETAL  3,138,060
CLAMPING MEANS FOR VARIABLE FOCAL LENGTH
PROJECTOR OBJECTIVE LENS
Filed Sept. 7, 1962
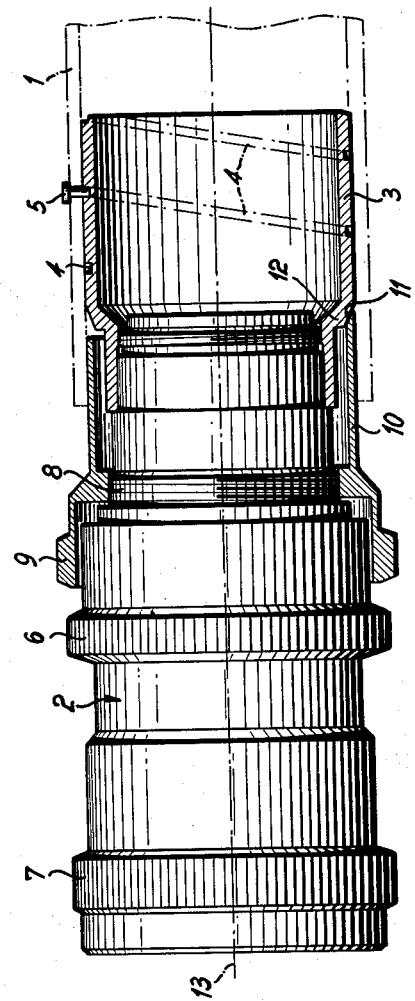
INVENTORS
JOACHIM EGGERT
RICHARD HOFMEISTER
BY Blum, Moscovitz,
Friedman and Blum
Att'ys.

United States Patent Office 3,138,060
Patented June 23, 1964

3,138,060
CLAMPING MEANS FOR VARIABLE FOCAL LENGTH PROJECTOR OBJECTIVE LENS
Joachim Eggert and Richard Hofmeister, Braunschweig, Germany, assignors to Voigtlander A.G., Braunschweig, Germany, a corporation of Germany
Filed Sept. 7, 1962, Ser. No. 222,094
Claims priority, application Germany Oct. 12, 1961
5 Claims. (Cl. 88—24)

This invention relates to variable focal length projector objectives of the type which are mounted for bodily adjustment relative to an objective mount of the projector. More particularly, the present invention is directed to a novel clamping means whereby the adjusted position of the objective in its mount may be retained without disturbance during adjustment of the focal length of the objective.

In the projection of slides using such pancratic projector objectives, the setting of the focus depends not only upon the distance between the projector and the screen or wall but also upon the exact position of the slide relative to the objective, as well as with respect to the given slide or frame carrier in the projector. In this aspect, the operator of the projector is apt to be confronted with deviations which lead to serious lack of definition where relatively high magnification is employed, the lack of definition being variable in dependence upon the selected distance between the projector and the screen.

Such deviations or setting errors, which are caused substantially by the tolerance of the usual slide carrying frames as well as by the more or less pronounced flexibility of the film slides, are usually compensated by adjustment of the focal length of the pancratic projection objective. The procedure followed involves first adjusting the pancratic objective to its shortest focal length, so that projection is effected with the highest possible magnification relative to the given distance of the screen from the projector. When this focal length setting has been effected, the slide is projected onto the screen and proper focusing of the image on the screen is effected by bodily shifting the entire objective in its mount or guide tube on a projector. Then, the pancratic objective is adjusted to its longest focal length, and hence the least magnification and, by adjustment of a focusing member, the definition of the image on the screen is corrected if it should have come out of focus as a result of changing from the shortest to the longest focal length. If these steps are carried out with precision for the two limits of adjustment of the pancratic objective, in the case of a given slide for which the focusing has been effected, the picture is projected with a constant definition over the entire focal length range of the pancratic objective lens. However, if the projection conditions are modified, as if the distance between the projector and the screen is changed, the mentioned series of focusing steps must be repeated.

Once the compensating focusing has been effected, the projection of other slides may be carried out with any resetting of the focus, necessitated by the divergent nature of the carrier frames or of the slides, being effected by bodily displacing the objective in its mount in the guide tube of the objective, in exactly the same manner as would be done with an objective of a constant focal length.

The usual mounting of the objective, for relative axial displacement, in a guide tube or the like, has the disadvantage, in the case of pancratic objectives that, upon changing the focal length or adjusting the focusing member, the objective inadvertently may bodily shift in its mount. As a result, the focus and definition is lost and the compensatory focusing is disturbed.

In accordance with the present invention, this disadvantage with respect to projectors equipped with pancratic objectives is obviated. More particularly, the pancratic objective is coupled in a novel manner to the projector and particularly to the objective mount, and a clamping device is provided to selectively lock the objective against bodily displacement relative to its mount. The device which disengageably fixes the objective with respect to the projector is disposed between the pancratic objective and the guide tube or mount of the projector. The clamping means is so mounted as to be capable of easy and convenient operation without in any way interfering with the functional efficiency of the projector and its objective lens.

The clamping means need not necessarily be mounted on the objective in order to perform its function, so long as it maintains the objective locked against bodily movement without risk of displacement. This can be effected by devising the arresting or clamping means so that, rather than being mounted on the objective, it is mounted on the projector and preferably on the objective guide tube or mount. Nevertheless, the clamping means of the invention preferably is directly associated with the objective, particularly in those cases where there is a lack of available space in the projector or its parts.

For an understanding of the principles of the invention, reference is made to the following description of a typical embodiment thereof as shown in the accompanying drawing. In the drawing, the single figure is a side elevational view, partly in axial section, illustrating a pancratic objective mounted in a guide tube or objective mount of a projector.

Referring to the drawing, only the tubular objective mount 1 of the projector is illustrated. A pancratic objective 2 is mounted in the tube 1 by means of an adapter 3. Adapter 3 is formed with a helical groove 4 into which projects a spring-loaded pin 5 mounted on guide tube or mount 1, and a knurled ring 6 is provided on objective 2 for bodily shifting the objective relative to the mount 1 by relative rotation of the objective.

By means of a second knurled ring 7, the focal length of objective 2 can be changed, in a known and familiar manner, by displacement along the optical axis 13 as by a rotary movement. By such adjustment, the operator may focus the projected image by adjusting the focusing member forming part of the objective 2 and which has not been specifically illustrated.

In the arrangement shown in the drawing, the clamping means comprises a collet 9 which is mounted for axial displacement. For this purpose, the collet 9 is threadedly engaged with the objective, as indicated at 8. The free inner end of the collet 9, which is the right end as viewed in the drawing, is formed with plural, preferably three, spring-loaded fingers or tangs 10 which are preferably at about 120° angular spacing from each other. The beveled ends 11 of the spring-loaded tangs 10 are disposed opposite a wedge or tapered surface 12 of the adapter 3. When collet 9 is displaced axially toward the adapter 3, the spring-loaded fingers engage the wedge or tapered surface 12 of the adapter 3, and are slightly expanded radially to effect the desired locking arrangement.

With the arrangement shown in the drawing, once the shortest focal length of pancratic objective 2 has been set, in the manner previously described and by operation of knurled ring 7, the objective 2 may be bodily displaced by rotation of knurled ring 6 to an extent sufficient to obtain proper focus and definition of the projected slide on the screen. Thereafter, knurled ring 6 is firmly held against rotation and collet 9 is rotated relative to ring 6. Due to its threaded mounting on objective 2, collet 9 is thus axially displaced so that beveled ends 11 of tangs 10 are pressed against wedge surface 12 of adapter 3. As these spring-loaded tangs are thus forced radially outwardly, they are firmly engaged against the inner surface of guide tube or mount 1, thus firmly locking objective 2 to the guide tube.

Thereafter, the longest focal length of objective 2 is fixed by rotating ring 7. Due to the clamping effect provided by collet 9, there will be no movement of the objective lens relative to guide tube or mount 1 during such adjustment. A further feature of the collet locking arrangement or clamping arrangement is that it serves to properly center the objective lens in guide tube 1, which is particularly advantageous in view of the quite considerable length of pancratic objectives, which have a variable focal length.

While a specific embodiment of the invention has been shown and described in detail to illustrate the application of the principles of the invention, it will be understood that the invention may be embodied otherwise without departing from such principles.

What is claimed is:

1. In a slide projector, an objective of the type having a variable focal length and having focal length adjusting means; an objective mount; said objective being supported in said mount for bodily axial adjustment relative thereto; and clamping means operatively associated with said objective and said mount and selectively operable to lock said objective against bodily axial displacement relative to said mount, said clamping means including a collet ring embracing said objective and having rotatable threaded engagement with the latter; said collet ring including circumferentially spaced projecting fingers engageable with an inner surface of said objective mount.

2. In a slide projector, clamping means as claimed in claim 1, said collet ring having three spring-biased fingers angularly displaced by 120° from each other.

3. In a slide projector, an objective of the type having a variable focal length and having focal length adjusting means; a tubular objective mount; a tubular adapter displaceable axially of said objective mount; said objective being supported in said adapter for bodily axial adjustment relative to said mount; and clamping means operatively associated with said objective, said adapter, and said mount and selectively operable to lock said objective against bodily axial displacement relative to said mount, said clamping means comprising an internally threaded collet ring rotatably mounted on said objective and threadedly engaged therewith, said collet ring having circumferentially spaced longitudinally projecting fingers extendable into said mount; said adapter having an annular tapered surface engageable by said fingers, upon relative rotation of said collet ring on said mount, to force said fingers into firm engagement with the inner surface of said mount to lock said objective against axial displacement relative to said mount.

4. In a slide projector, clamping means as claimed in claim 3, said projecting fingers being spring loaded and having beveled outer ends engageable with said tapered annular surface on said adapter.

5. In a slide projector, clamping means as claimed in claim 4, in which there are three fingers spaced angularly 120° from each other.

References Cited in the file of this patent
UNITED STATES PATENTS

| | | |
|---|---|---|
| 1,820,484 | Owens | Aug. 25, 1931 |
| 2,373,052 | Rausch | Apr. 3, 1945 |
| 2,431,172 | Harrison | Nov. 18, 1947 |
| 3,094,581 | Back | June 18, 1963 |